United States Patent [19]
Piott
[11] 3,715,504
[45] Feb. 6, 1973

[54] AUTOMATIC TELEPHONE ANSWERING AND RECORDING SYSTEM

[76] Inventor: Chester J. Piott, 6824 Cranford Drive, Dayton, Ohio 45459

[22] Filed: Nov. 17, 1970

[21] Appl. No.: 90,241

[52] U.S. Cl. ............179/6 AC, 179/100.2 S, 242/186
[51] Int. Cl. ..........................H04m 1/64, G11b 15/44
[58] Field of Search...179/6 R, 6 AC, 6 C, 6 E, 179/100.2 S, 100.2 Z; 274/4 D, 11 D; 242/186–201

[56] References Cited

UNITED STATES PATENTS

| | | | |
|---|---|---|---|
| 2,151,629 | 3/1939 | Wallis | 179/100.2 S |
| 2,364,556 | 12/1944 | Somers | 242/198 |
| 2,673,242 | 3/1954 | Van Deventer | 179/6 R |
| 3,102,699 | 9/1963 | Proctor | 179/100.2 Z |
| 3,589,734 | 6/1971 | Pastor | 274/4 D |

*Primary Examiner*—Raymond F. Cardillo, Jr.
*Attorney*—Nilsson, Robbins, Wills & Berliner

[57] ABSTRACT

An automatic telephone answering and recording system having a passive circuit for detecting the ringing of a telephone annunciator bell. The signal generated in the circuit is of a sufficient level to cause a passive electronic switching element to become conductive which in turn permits energization of the system. Moreover, the system outgoing message tape is used to actuate a tape rewind mechanism, as well as to control the timing sequence for recording the message on the incoming message tape. The system does not use solonoids, electromechanical relays, alternating current motors or capstan drives and uses a minimum of precision mechanical parts to achieve a low system cost.

7 Claims, 5 Drawing Figures

INVENTOR.

BY Chester J. Piott

INVENTOR.

BY Chester J. Piotr

AUTOMATIC TELEPHONE ANSWERING AND RECORDING SYSTEM

FIELD OF THE INVENTION

The invention relates in general to automatic telephone answering and recording systems, and more particularly to low power telephone answering system having a sequence actuating device provided directly on an outgoing message tape for actuating the system.

BACKGROUND AND SUMMARY OF THE INVENTION

Conventional telephone answering and recording systems utilize small amounts of power to maintain the system in a continuous standby state preparatory to receipt of an incoming telephone call. Such systems are satisfactory when a ready supply of electrical power is available for connection to the system. However, where the power supply is not available or where the system is such that it is designed to be portable and operate with a battery-type power supply, the amount of power drawn by the system must be kept to a minimum.

Moreover, in conventional telephone answering systems, a prerecorded message is normally provided, informing the party placing the call that the phone has been answered by an automatic answering system. At the end of the taped message, the caller is requested to state the purpose of his call. After the call has been completed, it is necessary to rewind the message tape or use a continuous loop tape so that the prerecorded message can be available for use with the subsequent calls. Typically, in either case, complex mechanisms are required to rewind, that is, reposition the prerecorded message tape to its original position. Such complex systems normally require more frequent maintenance and care to ensure unattended proper usage.

In order to overcome the attendant disadvantages of prior art automatic telephone answering and recording systems, the present invention provides means which maintain the entire system in an unconnected or non-power consuming state until a telephone ring is detected, thereby permitting the utilization of a total battery powered telephone answering system which draws power only when the system is actually in operation. Moreover, means are provided directly on an outgoing message tape for rewinding the outgoing message tape, as well as controlling the timing sequence for recording the message on the incoming tape in conjunction with the particular timing sequence.

The invention comprises a telephone answering and recording system having a passive circuit for detecting the ringing of the telephone annunciator bell. The signal generated in the circuit is of a sufficient level to trigger a passive electronic switching element such as a silicon controlled rectifier (SCR) into a conducting state, which in turn permits energization of the system. Moreover, means are provided at each end of the outgoing message magnetic tape for actuating the tape rewind mechanism, as well as controlling the timing sequence for recording the message on an incoming message tape.

The advantage of this invention, both as to its construction and mode of operation will be readily appreciated as the same becomes better understood by reference to the following detailed description when considered in connection with the accompanying drawings, in which like referenced numerals designate like parts throughout the figures.

DETAILED DESCRIPTION

Figure 1:
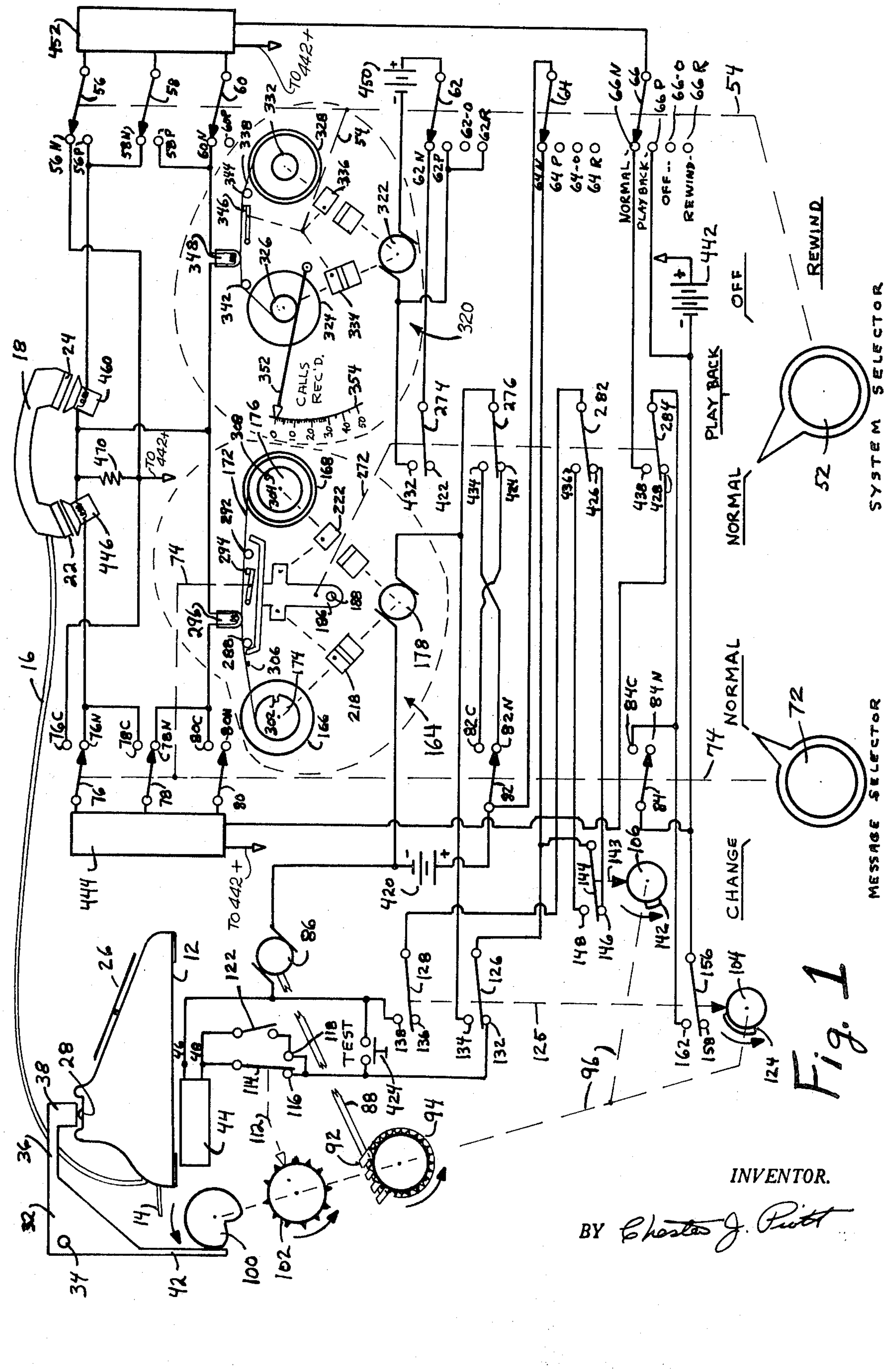
FIG. 1 depicts a schematic diagram of the automatic telephone answer and recording system.

Referring now to the drawings, there is shown in FIG. 1 a preferred embodiment of the automatic telephone answering and message recording system. The system may be utilized in combination with a conventional telephone having a base 12 having an incoming telephone cable 14. The base 12 is connected by means of a cable 16 to a handset 18 having a transmitter 22 and a receiver 24. The telephone base contains a conventional dial plate 26 and has mounted within the base an annunciator bell (not shown) which rings when a party attempts to contact the subscriber telephone. Further, as is conventional, phone buttons 28 are utilized to obtain a dial tone when the buttons are raised for use in dialing use or are depressed to allow the annunciator bells to ring to notify the subscriber that a party is attempting to contact the subscriber.

To operate the telephone in the automatic mode, the handset 18 is removed from the base and a generally L-shaped linkage 32, which is pivotable at the corner point 34 of the L-shaped member, is utilized in combination with the telephone base buttons 28. The linkage 32 has first arm 36 having a button depressing section 38 integral with the end of the arm, the section 38 in the position shown in FIG. 1, causing the buttons 28 to remain depressed. The linkage 32 also contain a second arm 42. Further, positioned directly below the telephone base 12 is an annunciator bell detector 44 having a pair of output terminals 46, 48.

A system selector switch 52 is movable to four positions in a clockwise direction, i.e., "NORMAL," "-PLAYBACK," "OFF" and "REWIND," which moves by means of a ganged linkage 54, six armatures 56, 58, 60, 62, 64 and 66 and clutches 334, 336 and erase magnet 346. In each of the four positions, each of these six armatures are moved to one of four contact positions "N," "P," "O," or "R," associated with its respective armature.

A message selector switch 72 is movable to either a "CHANGE" position or a "NORMAL" position which, in turn, operates a ganged linkage 74 to move five armatures 76, 78, 80, 82 and 84 and erase magnet 294. In each of these two positions, each of these five armatures are moved to one of two contact positions "C" or "N" associated with its respective armature.

A D.C. sequence motor 86 is utilized to drive a shaft 88 having a worm 92 at the end thereof. The worm gear, in turn, is designed to drive a worm gear 94 in a counterclockwise direction. A shaft 96 associated with the gear 94 and depicted by a dotted line rotates in a counterclockwise direction as the worm gear 92 drives the gear 94. Coupled to the shaft 96 and rotatable in a counterclockwise direction therewith are four cam members 100, 102, 104 and 106.

The cam 100 is designed so that its surface abuts the side of linkage arm 42 for 270° and allows the buttons 28 to remain depressed during this interval. However, during the remaining 90° movement, the arm 42 is moved into an indentation in the cam 100 by the buttons 28 moving upward causing section 38 to raise and the linkage 32 pivots at the point 34.

The cam 102 has 12 teeth, equally spaced, 30° around its perimeter and has a linkage 112, one end of which rides on the cam perimeter and the other end of which is mechanically linked to a switch armature 114. One end of the armature 114 is connected to the terminal 48 and the other end is movable between a terminal 116 and a terminal 118, dependent upon whether the linkage is off the teeth or on the teeth of the gear 102, respectively. Alternatively, the path from the terminal 48 through the armature 114 may be by-passed by means of closure of a normally open switch 122.

The cam 104 contains an enlarged 90° segment 124 on its surface and has a mechanical linkage 125 associated therewith which is coupled to three individual armatures 126, 128 and 156. The armature 126 is movable between a pair of terminals 132, 134 and the armature 128 is movable between the terminals 136, 138 and the armature 156 is movable between terminals 158 and 162. With the linkage 125 adjacent the surface of the cam 104, the armatures 126, 128 and 156 are connected to the terminals 132, 136 and 158 respectively. As the cam rotates, so that the linkage is adjacent the surface 124, the armatures 126, 128 and 156 are connected to the terminals 134, 138 and 162, respectively.

The cam 106 contains an enlarged 45 degree segment 142 on its outer surface and a mechanical linkage 143 associated therewith. The linkage is utilized to operate a switch armature 144 movable between terminals 146 and 148. The armature 144 is connected to the terminal 146 except when the linkage 143 is adjacent the segment 142 when it is connected to the terminal 148.

Figures 2, 3, 4:
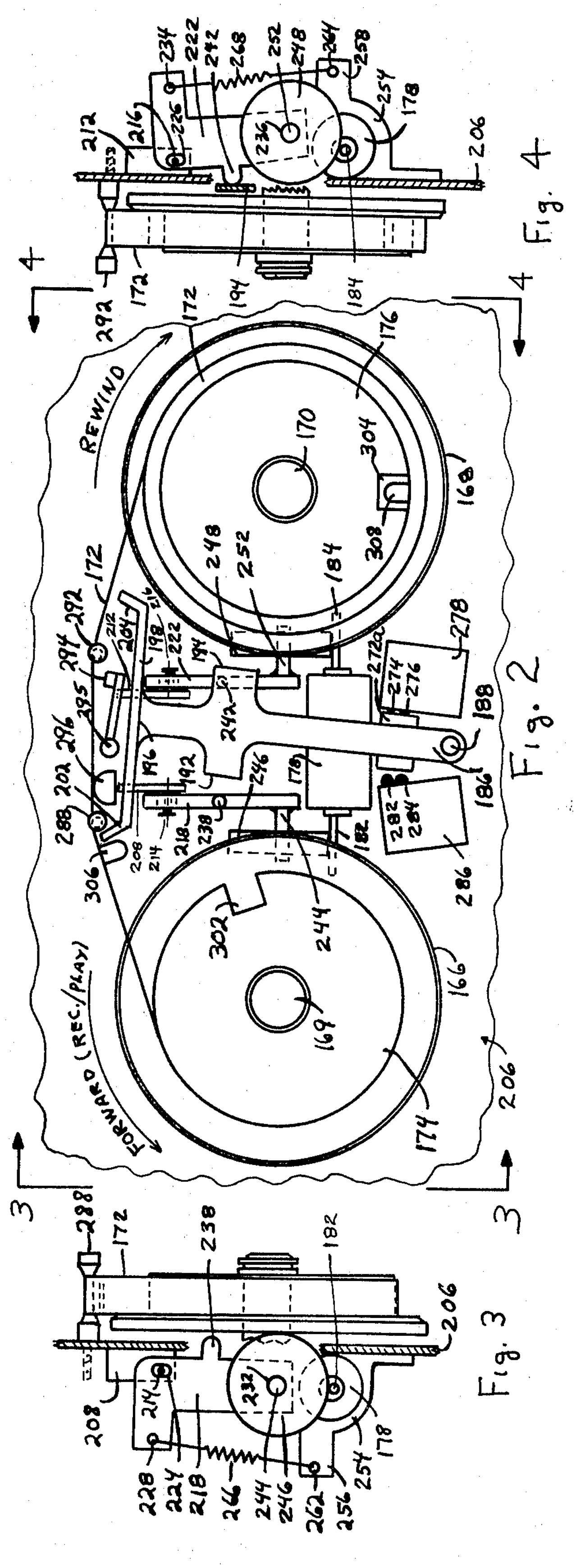
FIG. 2 illustrates a plan view of the outgoing message tape deck used in the system of FIG. 1, in accordance with the invention.
FIG. 3 shows a side view of the tape deck of FIG. 2 taken along the line 4—4 of FIG. 2.
FIG. 4 depicts a side view of the tape deck of FIG. 2 taken along the line 4—4 of FIG. 2.

The outgoing message tape deck 164 shown schematically within the dotted lines in FIG. 1, is illustrated in greater detail in FIG. 2. The tape deck 164 comprises a first turntable 166 and a second turntable 168 having spindles 169, 170 respectively. The outgoing message, which is transmitted when the telephone ringing has been detected, is recorded on a tape 172 and transmitted as the tape reels 174 and 176 on the turntable 166 and 168, respectively, rotate counterclockwise moving the tape 172 from reel 176 to reel 174. Movement of the turntable is accomplished by means of a drive motor 178 having a pair of shafts 182, 184, extending out of each end of the motor and operatively associated with the turntables 166, 168 respectively.

A cross-shaped clutch lever 186 which is pivotable at one end point 188 is utilized to engage one of the drive wheels 246, 248 while simultaneously disengaging the other drive wheel. The clutch lever further contains opposed arms 192, 194 and has mounted at the end 196 opposite the pivot point 188, a U-shaped member 198 whose base is secured to the end 196 of the lever and contains a pair of side arms 202, 204.

A recorder chassis 206 has a pair of brackets 208, 212 secured thereto, each having a fastener 214, 216 respectively, positioned thereon. A pair of L-shaped clutch linkages 218, 222 each have a slotted opening 224, 226, respectively at the corner of the L, which allows each of the linkages to be movable mounted on the fasteners 214, 216, affixed to brackets 208, 212, respectively. The linkage 218 further comprises a second opening 228 and a third opening 232 at the ends of the linkage arms. The linkage 222 also contains a second opening 234 and a third opening 236 at the ends of the linkage arms. The linkages are positioned in a plane normal to the clutch lever 186 and each contains a rounded tip 238, 242, respectively, extending toward the lever.

Secured to a shaft 244 which is mounted in the opening 232 of linkage 218 is a drive wheel 246 whose outer perimeter is engageable with the shaft 182 of motor 178. Also, the shaft 184 is engageable with a drive wheel 248 which, in turn, is secured to a shaft 252 positioned in the opening 236 of the linkage 222.

A motor mount 254 which is secured to the chassis 206 (for clarity the mount is not depicted in FIG. 2) contains a pair of rearwardly extending brackets 256, 258 each of which has an opening 262, 264, respectively, at the end thereof. Secured between the opening 228 of the linkage 218 and the opening 262 is a tension spring 266 and a tension spring 268 is secured between the opening 264 and the opening 234 in the linkage 222. The tension springs 266 and 268 keep the drive wheels 246, 248 in constant frictional engagement with the motor shafts 182, 184 respectively.

Secured to the clutch lever 186 just above the pivot point 188 is a switch actuator mechanism 272a, which when the lever 186 is pivoted towards the turntable 168, as shown in the drawings, contacts a pair of switch armatures 274, 276 mounted in a housing 278. Further, when the lever is pivoted toward the turntable 166, mechanism 272 contacts a pair of switch armatures 282, 284 mounted in a housing 286.

A pair of stops which also act as tape guides 288, 292, are positioned on the chassis 206 to limit pivotal movement of the level 186, with the stop 288 positioned to engage the arm 202 and the stop 292 positioned to engage the arm 204. Also mounted on the chassis is an erase magnet 294 pivoted at 295 and a record and play-back head 296.

Each of the tape reels 174, 176 contain U-shaped recesses 302, 304, respectively, formed in the outer edge of the reel. The U-shaped recesses are of sufficient size so that weights 306, 308 secured near each of the respective ends of the magnetic tape 172 can drop in the recesses.

The incoming message magnetic tape deck 320 is shown generally within the dotted line in FIG. 1 and comprises a drive motor 322 used to alternately drive a first turntable 324 having a take up reel 326 thereon or a second turntable 328 having a reel 332 thereon. The motor 322 may be coupled through the forward motion clutch 334 or rewind clutch 336 to the turntable 324, 328 respectively, through opposite ends of the motor shaft in a manner similar to the arrangement of the outgoing message tape deck 164.

The incoming message tape 338 moves from the reel 328 to the reel 326 and passes record/playback head 348 and tape guides 342, 344. An erase magnet 346 can be coupled to a linkage 54 so that when the rewind clutch 336 is engaged, and the forward clutch 334 disengaged, the erase magnet is pivoted away from the magnetic tape. The erase magnet 346 is also pivoted away from tape 338 during "playback." Recording and playback of the incoming message tape is made through the head 348. Further, a pivoting pointer 352 associated with the reel 326 can be read on a scale 354 to inform the user that incoming calls have been received.

Figure 5:
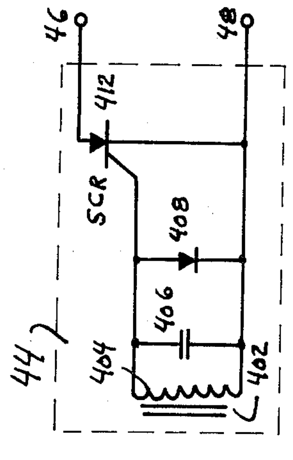
FIG. 5 illustrates a schematic diagram of the electrical circuit for detecting the telephone bell ringing in the system of FIG. 1.

Referring now to FIG. 5, there is shown a preferred embodiment of the annunciator bell detector 44 circuit. The detector comprises an iron core 402 having a winding 404 which is coupled in parallel with a capacitor 406. The winding 404 and capacitor 406 together form a tank circuit. Also connected in parallel across the winding 404 and capacitor 406 is a diode 408. A silicon controlled rectifier (SCR) 412 has its anode connected to the terminal 46 and its cathode connected to the terminal 48. Further, the gate of the SCR is connected to the anode of the diode 408 and the cathode of the diode is connected to the cathode of the SCR.

With the selector switches 52 and 72 in the "NORMAL" position, and the linkage 32 positioned as in FIG. 1, the magnetic field caused by the ringing of the telephone induces a voltage across the winding 404. During alternate half cycles the diode 408 is forward biased so as to conduct and cause a current to flow from the gate of SCR 412 to the cathode of SCR 412 causing a conductive state between the anode terminal 46 and cathode terminal 48. With the SCR in a conductive state, a D.C. voltage source 420 is connected across the sequence motor 86 through a path comprising the SCR 412 connected across the terminals 46, 48, armature 114, terminal 116, terminal 132, armature 126, terminal 64N and armature 64.

Actuation of motor 86 rotates cam member 102 until linkage 112 rides up one of the teeth of the cam 102 causing linkage 112 to move armature 114 from terminal 116 to terminal 118, momentarily interrupting current flow to the motor 86 since SCR 412 stopped conducting. In a typical arrangement cam 102 moves 30° during a two second ringing period and operates motor 86 as a stepper switch during the ringing period. Further, the motor 86 will not rotate during the three second period between rings. By such an arrangement after the eighth ring, when cams 100 and 102 have moved through three quarters of a turn, linkage 32 will pivot releasing buttons 28 and the phone will be answered. Alternatively, normally open switch 122 can be closed and motor 86 will continue rotating after the first ring and the phone will be answered immediately. Moreover, a test switch 424 can be provided between the terminal 116 and terminal 46 which performs the same function electrically as the SCR 412 was conducting in order to test operation of the system.

Further, when the cams 100 and 102 have rotated three quarters of a turn, cam 104 has rotated three quarters of a turn so that the linkage 125 is positioned on the segments 124. In this position, armatures 126, 128 and 156 are connected to terminals 134, 138 and 162, respectively.

When the phone is initially answered, the outgoing message tape deck is in the position shown in FIG. 1 and 2, with the clutch linkages coupling the drive motor 178 to the turntable 166 and decoupling it from turntable 168. Simultaneously, with the clutch lever 186 positioned as shown, switch actuator mechanism 272 causes the switch armatures 274, 276, 282 and 284 to be connected to terminals 422, 424, 426 and 428, respectively. Moreover, when the clutch lever 186 is subsequently moved so that motor 178 drives turntable 168, these armatures are coupled to terminals 432, 434, 436 and 438, respectively.

When the phone is answered and cam 104 has rotated three quarters of a turn, a source of D.C. power supply 442 is coupled to an outgoing audio amplifier 444 through the armature 156, terminal 162, armature 284 and terminal 428. The amplifier 444 is coupled to a microphone 446 and record and playback head 296 through the armatures 76 and 78 which are connected to the terminals 76N and 78N, respectively. The telephone transmitter 22 is positioned so that it is adjacent to the speaker/microphone 446.

Further, the movement of armature 126 to terminal 134 disconnects the motor 86 from D.C. voltage source 420 and connects the voltage across the motor 178 through armature 64 and terminal 64N. The motor 178 then drives the outgoing message tape 172 past the record and playback head 296 for a period of 20 seconds (nominally) during which the message on the tape is transmitted to the caller. At the end of the 20 second period the tape 172 is substantially wound on reel 174, at which time the weight 308 at the end of the tape abuts side arm 204 causing the arm to move against stop 292. Motor 178 then becomes disengaged from turntable 166 and drives turntable 168 so that the tape 172 is rewound. Simultaneously armatures 274, 276, 282 and 284 are moved so that they now are connected to terminals 432, 434, 436 and 438.

The incoming message drive motor 322 then becomes energized by a D.C. power supply 450 through the path formed by armature 62, terminal 62N, armature 274 and terminal 432. Simultaneously, an incoming audio amplifier 452 is coupled to the D.C. voltage source 442 through the armature 66, terminal 66N, terminal 438, armature 284, terminal 162 and armature 156. The caller now has a 20 second period during which he can transmit his message which is recorded on tape 338.

The caller's message is transmitted from the receiver 24 to the pickup microphone 460 which is connected on one side to the terminal 58N and hence to the armature 58 which is connected to the amplifier 452. The other side of the pickup 460 is connected to one side of the head 348, the other side of the head being coupled to the terminal 60N which in turn is connected to armature 60 and hence the amplifier 452.

Moreover, after 20 seconds motor 86 is again connected to the source 420, with the movement of the lever 186 through terminal 138, armature 128, armature 282, terminal 436, terminal 148, armature 144, terminal 64N and armature 64 driving all cams one-eighth of a turn until linkage 143 returns to the surface of cam 106, disconnecting the motor 86 from source 420 as armature 144 moves to terminal 146.

At the conclusion of the rewinding of the tape 172 onto reel 176, weight 306 moves the side arm 202 against stop 288 and the switch armature 274, 276, 282 and 284 are repositioned as in FIGS. 1 and 2 by movement of linkage 272 by lever 186. Further, rewind clutch linkage 222 is disengaged which stops the rewinding of tape 172, while clutch linkage 218 is engaged for forward travel of tape 172. However, source 420 is now disconnected from motor 178 because of repositioning of switch armature 276. Further, source 420 is connected to motor 86 through terminal 138, armature 128, armature 282, terminal 426, terminal 146, armature 144, terminal 64N and armature 64. Motor 86 drives all cams another one-eighth turn, at which time linkage 125 drops to the surface of cam 104 moving armature 128 to terminal 136 and disconnecting the source 420 from the motor 86. This last one-eighth turn moves armature 156 to terminal 158 disconnecting the source 442, as well as rotating cam 100 to move linkage 32 and depress telephone button 28 to await the next call.

Moreover, the movement of armature 274 to terminal 422 upon completion of the rewinding of the tape 172 disconnects the source 450 from motor 322. The pointer 352 which has been moved by the accumulation of tape 338 on reel 326 is used as an indication that a call has been received.

To rewind the incoming message tape 338 so as to enable replay of the tapes, the switch 52 is moved to the "REWIND" position moving armatures 56, 58, 60, 62, 64 and 66 to the terminals 56R, 58R, 60R, 62R, 64R and 66R respectively. Linkage 54 manually engages the rewind clutch 336 and disengages the forward clutch 334, simultaneously pivoting erase magnet 346 away from the magnetic tape. Further, movement of the armature 62 to terminal 62R connects source 450 to the motor 322 causing tape 338 to be rewound on reel 332. Upon completion of the rewinding of the tape as indicated by the pointer 352, the rewind action is terminated by movement of the switch 52 to either the "OFF" or "Normal" position.

To playback the recorded incoming messages, the handset 18 is removed from the speaker/microphone combinations 446 and 460 and the switch 52 is moved to the "PLAYBACK" position moving armature 56, 58, 60, 62, 64 and 66 to their respective "P" terminal. The audio amplifier 452 is connected to the source 442 through armature 66 and terminal 66P. Motor 322 is connected to the source 450 through the armature 62 and terminal 62P. Further, the amplifier 452 is connected to the microphone 460, which now functions as a speaker, and head 348 through the armature 56 and 58 and their terminal 56P and 58P, respectively. Further, clutch 334 is manually engaged while clutch 336 is disengaged and erase magnet 346 is moved away from tape 338 so that playback head 348 can transmit the message through amplifier 452 to speaker 460. Also, armature 64 is connected to terminal 64P, precluding incoming calls during playback by disconnecting source 420 from motor 86. Playback is terminated when the switch 52 is moved to the "OFF" or "NORMAL" position. Further, the tape may be rewound, of course, by moving the selector switch to the "REWIND" position.

To change the outgoing message, the user speaks into the microphone 446 when the selector switch 72 is moved to the "CHANGE" position. Movement of the switch to this position causes the linkage 74 to move erase magnet 294 against the tape 172 and the armatures 76, 78, 80, 82 and 84 are connected to the terminals 76C, 78C, 80C, 82C and 84C respectively. Movement of the armature 76, 78 and 80 changes the amplifier 444 so that it operates in a record function utilizing the microphone 446 and head 296. Armature 82 now connects the source 420 to motor 178 through the armature 276 and terminal 424. Armature 84 connects the source 442 to the amplifier 444 through the armature 284 and terminal 428. At the conclusion of the newly recorded outgoing message, weight 308 moves side arm 204 of lever 186 against stop 292 and the armature 276 moves to terminal 434 disconnecting the source 420 from motor 178. At this point clutch linkage 222 becomes engaged and clutch linkage 218 disengaged. The message is then rewound onto reel 176 by moving "SYSTEM SELECTOR" 72 back to the "-NORMAL" position which repositions armatures 76, 78, 80, 82 and 84, as well as removing erase magnet 294 from the tape. The source 420 is now connected to the motor 178 through the path comprising armature 82, terminal 82N, terminal 434 and armature 276. When the tape has been rewound, weight 306 moves side arm 202 of lever 186, engageing clutch 218 and disengageing clutch 222 and repositioning armatures 274, 276, 282 and 284 with the movement of armature 276 causing the motor to stop. The system is now ready to answer the phone again.

A registor 470 has been shown connected between the junction of microphones 446, 460 and the common terminals 56N, 76C to limit current flow to the members 446, 460 when the amplifiers 444, 452 are in the record mode of operation.

Further, it should be understood that each of the switches formed by armatures 114, 126, 128, 144, 156, 274, 276, 282, and 284 can be single pole, double throw, which are designed for low force actuation. Moreover, as should be noted, the motors 86, 178 and 322 can be low drain, high torque D.C. motors.

Also, the system readily can accommodate such optional features as a flashing light to show that a call was received since last attended. In addition, a dual track record/play head for the outgoing message tape with selection of either channel can be incorporated in the system. Further, a trickle charger can be incorporated where possible, to sustain the batteries at their full voltage.

What is claimed is:

1. An automatic telephone answering and recording system comprising:

a motor drive system including a first drive means for driving a first turntable and a second drive means for driving a second turntable;

switching means for connecting one of said drive means to one of said turntables while disconnecting the other of said drive means from said other turntable comprising: a clutch lever having means thereon to move said other drive means to a disconnecting position; and a first message tape movable between said first turntable and said second turntable, said tape having means mounted at each end of the tape for engaging said clutch lever and moving said lever from a first position wherein one of said drive means is connected with one of said turntables to a second position wherein the other drive means is connected to the other turntable and disconnecting said one drive means from said one turntable.

2. An automatic telephone answering and recording system in accordance with claim 1, and further comprising switch means actuated by said clutch lever for controlling the operation of a message recording turntable, said message recording turntable being operational during the period said first message tape is being rewound.

3. An automatic telephone answering and recording system in accordance with claim 1 wherein said motor drive system comprises a D.C. motor having a shaft extending from each end of the motor, each of said shafts being in constant engagement with one of said drive means.

4. An automatic telephone answering and recording system in accordance with claim 3 wherein said D.C. motor rotates in the same direction when said drive means is connected to either of said turntables.

5. An automatic telephone answering and recording system in accordance with claim 1 wherein said means mounted at each end of said tapes comprises weights which engage said clutch lever and move said lever from said first position to said second position and vice versa.

6. An automatic telephone answering and recording system in accordance with claim 5, wherein each of said turntables have tape reels mounted thereon, each of said tape reels having recesses therein for positioning of said tape weights.

7. An automatic telephone answering and recording system in accordance with claim 5 wherein said clutch lever is generally cross-shaped and is pivotable at one end point and contains a U-shaped member at the other end, said cross-shaped member further comprising opposed arms, one of said arms being movable to disengage one of said drive means while simultaneously enabling said other drive means to engage one of said turntables, said weights engaging the U-shaped portion of said clutch lever.

* * * * *